(12) United States Patent
Toda

(10) Patent No.: US 8,649,977 B2
(45) Date of Patent: Feb. 11, 2014

(54) GPS COMPOSITE NAVIGATION APPARATUS

(75) Inventor: Hiroyuki Toda, San Francisco, CA (US)

(73) Assignee: Furuno Electric Company Limited, Nishinomiya-shi (JP)

( * ) Notice: Subject to any disclaimer, the term of this patent is extended or adjusted under 35 U.S.C. 154(b) by 698 days.

(21) Appl. No.: 12/532,368

(22) PCT Filed: Nov. 26, 2007

(86) PCT No.: PCT/JP2007/072716
§ 371 (c)(1),
(2), (4) Date: Mar. 25, 2010

(87) PCT Pub. No.: WO2008/117492
PCT Pub. Date: Oct. 2, 2008

(65) Prior Publication Data
US 2010/0211315 A1   Aug. 19, 2010

(30) Foreign Application Priority Data

Mar. 22, 2007   (JP) .................. 2007-073836

(51) Int. Cl.
*G01C 21/28* (2006.01)
*G01S 19/47* (2010.01)
*G01S 19/40* (2010.01)
*G01C 21/00* (2006.01)

(52) U.S. Cl.
CPC .............. *G01S 19/47* (2013.01); *G01S 19/40* (2013.01); *G01C 21/005* (2013.01)
USPC .......... 701/480; 701/510; 701/536; 701/472; 342/357.3

(58) Field of Classification Search
USPC ........................................... 701/216
See application file for complete search history.

(56) References Cited

U.S. PATENT DOCUMENTS 5,760,737 A * 6/1998 Brenner .................. 342/357.58
6,167,347 A   12/2000 Lin
(Continued)

FOREIGN PATENT DOCUMENTS

JP   2001-174275 A   6/2001
JP   2001-337156 A   12/2001
(Continued)

OTHER PUBLICATIONS

International Search Report of PCT/JP2007/072716 mailed on Dec. 25, 2007.
(Continued)

*Primary Examiner* — Shelley Chen
(74) *Attorney, Agent, or Firm* — Nutter McClennen & Fish LLP; John J. Penny, Jr.; Christina M. Sperry

(57) ABSTRACT

In a GPS composite navigation apparatus of a configuration having a GPS receiver, variation in an estimated position, an estimated velocity, and an estimated azimuth of a moving body when the moving body is not moving is resolved, and the GPS/INS integrated navigation system with good response characteristics from a stationary state to a moving state. A stationary detector for determining the stationary state of the moving body is provided, and when it is determined to be the stationary state by the stationary detector, a measurement model used for measurement-update of a Kalman filter is changed, while a changed amount of an error covariance matrix by the update is corrected.

12 Claims, 2 Drawing Sheets

(56) References Cited

U.S. PATENT DOCUMENTS

| | | |
|---|---|---|
| 6,240,367 B1 | 5/2001 | Lin |
| 6,246,960 B1 | 6/2001 | Lin |
| 6,292,750 B1 | 9/2001 | Lin |
| 6,311,129 B1 | 10/2001 | Lin |
| 6,408,245 B1 | 6/2002 | An et al. |
| 6,480,152 B2 | 11/2002 | Lin et al. |
| 6,697,736 B2 | 2/2004 | Lin |
| 6,721,657 B2 * | 4/2004 | Ford et al. .................. 701/472 |
| 6,826,478 B2 * | 11/2004 | Riewe et al. ................. 701/470 |
| 7,193,559 B2 * | 3/2007 | Ford et al. ............... 342/357.32 |
| 7,761,233 B2 * | 7/2010 | Schott et al. ................. 701/434 |
| 7,860,651 B2 * | 12/2010 | Morgan et al. .............. 701/510 |
| 2002/0198656 A1 * | 12/2002 | Ford et al. .................... 701/213 |
| 2003/0117317 A1 * | 6/2003 | Vanderwerf et al. ..... 342/357.02 |
| 2003/0216865 A1 * | 11/2003 | Riewe et al. ................. 701/220 |
| 2004/0150557 A1 * | 8/2004 | Ford et al. ............... 342/357.14 |
| 2007/0050138 A1 * | 3/2007 | Morgan et al. .............. 701/220 |
| 2007/0073481 A1 * | 3/2007 | Morgan et al. .............. 701/220 |
| 2008/0004796 A1 * | 1/2008 | Schott et al. ................. 701/201 |

FOREIGN PATENT DOCUMENTS

| | | | | |
|---|---|---|---|---|
| JP | 2001337156 A | * | 12/2001 | ............... G01S 5/14 |
| JP | 2004-239643 A | | 8/2004 | |
| JP | 2004239643 A | * | 8/2004 | ............ G01C 21/16 |
| JP | 2005-195395 A | | 7/2005 | |
| JP | 2006-209567 A | | 8/2006 | |

OTHER PUBLICATIONS

Anastasia Olegovna Salytcheva, Medium Accuracy INS/GPS Integration in Various GPS Environments, UCGE Reports, University of Calgary, 2004, pp. 88-113.

Yufeng Zhang and Yang Gao, Observability Analysis of Initial Alignment and Its Accuracy Improvement, The University of Calgary pp. 1456-1464.

Written Opinion dated Dec. 16, 2010 for Singapore Patent Application No. 200906099-7.

* cited by examiner

GPS COMPOSITE NAVIGATION APPARATUS

TECHNICAL FIELD

The present invention relates to a GPS composite navigation apparatus that calculates a position, a velocity, an azimuth and the like of a moving body, and more particularly to the GPS composite navigation apparatus with improved estimation capabilities of the position and the azimuth when the moving body is not moving.

BACKGROUND

Conventionally, GPS/INS integrated navigation systems that calculate estimated positions, estimated velocities, estimated attitudes, estimated azimuths and the like of a moving body obtained by integrating sensors, such as a GPS, an inertial sensor, and a velocity sensor widely use a Kalman filter for error estimation. The estimation capability of the errors by the Kalman filter greatly influences model errors of a dynamic model or a measurement model, and particularly, the model errors differ greatly when the moving body is moving and is not moving. Further, in the stationary state, due to observable problems of the measurements, it may not be able to estimate for states of some errors, or the estimation accuracy may deteriorate. As a result, even though the moving body is stopped, a disadvantage may occur in which the positions, the velocities, the attitudes, and the azimuths vary.

In order to avoid the disadvantage, typical GPS/INS integrated navigation systems may be required to be constituted with a GPS receiver including multiple GPS antennas, and a highly-accurate three-axis accelerometer and a three-axis angular rate sensor; however, they are expensive (hundreds of thousands of yen to millions of yen). Particularly, for the land-based applications requiring a low-cost (tens of thousands of yen), configurations with a GPS receiver having a single GPS antenna, a low-cost single-axis inertial sensor, and a low-cost velocity sensor are desirable.

However, in the low-cost system configuration, degradation of the estimation capability due to at least the model errors, the observable problems, and particularly the weak observations in the stationary state cannot be avoided. Therefore, the disadvantage in which the position, the velocity, the attitude, and the azimuth vary will be remarkable even though the moving body is stopped.

As measures against the disadvantage which the low-cost system configuration has, a method adopting a measurement model equation is known, in which the velocity measurements, the angular rate measurements and the like are zero when the moving body is not moving (for example, Nonpatent Documents 1 and 2).

[Nonpatent Document 1] Anastasia Olegovna Salytcheva, "Medium Accuracy INS/GPS Integration in Various GPS Environments," UCGE Reports Number 20200, Canada, UNIVERSITY OF CALGARY, 2004, pp 107

[Nonpatent Document 2] Yufeng Zhang and Yang Gao, "Observability Analysis of Initial Alignment and Its Accuracy Improvement," ION GNSS 18th International Technical Meeting of the Satellite Division, 13-16 Sep. 2005, Long Beach, Calif., pp 1

SUMMARY

Problem to be Solved by the Invention

However, the method of setting the velocity measurement to zero when the moving body is not moving as disclosed in the Nonpatent Document 1 requires to theoretically set the measurement error of the velocity measurement to zero. However, from a viewpoint of stabilization of the Kalman filter, because the measurement error cannot be set to zero, it is set to a very small value. As a result, an error covariance matrix calculated with the Kalman filter will be very small. In this state, an desirable condition in which responses are degraded will newly arise if it is switched to a measurement model equation of the moving state of the moving body.

Generally, as measures against the degradation of responses, a method of reinitializing the error covariance matrix for the stationary state with large values is used, when changing the measurement model at the time of start moving. However, in this method, the positions, the velocities, the azimuths and the like jump at the time of initialization of the error covariance matrix.

The present invention is made in view of the undesirable conditions, and resolves the change in position, velocity, and azimuth in a stationary state, while resolving degradation of responses from the stationary state to the moving state.

Means for Solving Problem

In order to resolve the conditions, according to an aspect of the present invention, a GPS composite navigation apparatus having at least a GPS receiver and an inertial sensor, includes a navigation processor for calculating at least any of an estimated position, an estimated velocity, and an estimated azimuth of a moving body, an error estimator by Kalman filter for estimating, based on an output from the navigation processor and an output from the GPS receiver, any of errors of at least the estimated position, the estimated velocity, and the estimated azimuth of the output from the navigation processor, and a stationary detector for determining a state in which the moving body is stopped. When determined to be in the stationary state by the stationary detector, a measurement model for a moving state used for measurement-update of the Kalman filter is changed to a measurement model for the stationary state, and a changed amount of an error covariance matrix by update is corrected. By this, the moving body can be maintained in the stationary state, and responses at the time of a moving start can be improved.

According to the aspect of the present invention, the measurement about the position and/or the azimuth in the measurement model for the stationary state may be set to a difference between the estimated positions and/or the estimated azimuths of current epoch and preceding epoch. By this, the estimated position of the moving body in the stationary state can be prevented from varying.

According to the aspect of the present invention, in order to correct a changed amount of the error covariance matrix by the measurement-update of the Kalman filter, a difference between measurement-updated error covariance matrixes of preceding epoch and the current epoch of the error covariance matrix may be set to a correction amount. Then, the correction amount may be added to or subtracted from any of the current measurement-updated error covariance matrix, the current time-updated error covariance matrix, and the current error variance matrix of a dynamic model. By this correction, responses at the time of the moving start of the moving body can be improved.

According to the aspect of the present invention, in the correction of the changed amount of the error covariance matrix by the measurement-update of the Kalman filter, a difference between diagonal elements of the measurement-updated error covariance matrix of the preceding epoch and the current epoch may be set to the correction amount. Then, the correction amount may be added to or subtracted from any of the diagonal element of the current measurement-updated error covariance matrix, the diagonal element of the current time-updated error covariance matrix, and the diagonal element of the current error variance matrix of a dynamic model.

According to the aspect of the present invention, the measurement about the position and/or the azimuth in the measurement model for the stationary state may be set to a difference between the estimated positions and/or the estimated azimuths of the current epoch and at the time of the stationary determination. Further, the correction amount for correcting the changed amount of the error covariance matrix by the measurement-update may be set to a difference between the measurement-updated error covariance matrix of the current epoch and the measurement-updated error covariance matrix at the time of the stationary determination.

According to the aspect of the present invention, the navigation processor may estimate the estimated position, the estimated velocity, and the estimated azimuth of the moving body based on at least a position from the GPS receiver, outputs from an accelerometer for measuring an acceleration of the moving body in the traveling direction, and an output from an angular rate sensor for measuring a rotation component of the moving body about an azimuth axis.

According to the aspect of the present invention, a velocity sensor for measuring a velocity of the moving body in its traveling direction may be provided. By substituting the velocity derived from the accelerometer with the output from the velocity sensor, the navigation processor may calculate the estimated position, the estimated velocity, and the estimated azimuth of the moving body.

According to the aspect of the present invention, as the measurement of the measurement model for the stationary state, the measurement of the velocity and/or the angular rate of rotation of the moving body about an azimuth axis may be added. The measurement of the velocity and/or the angular rate may be set to the estimated velocity and/or the estimated angular rate of the current epoch.

Advantageous Effects of Invention

According to the aspect of the present invention, in the estimation of the position error and the azimuth error by the Kalman filter, the error covariance immediately before the moving body is stopped is corrected so that the error covariance matrix is maintained constant during the stationary state by adding or subtracting the changed amount of the error covariance matrix by the measurement-update to/from the error covariance matrix after the change.
Therefore, the disadvantage in which the estimated position and the estimated azimuth vary even though the moving body is in the stationary state can be resolved.

DESCRIPTION OF REFERENCE NUMERALS

Figure 1:
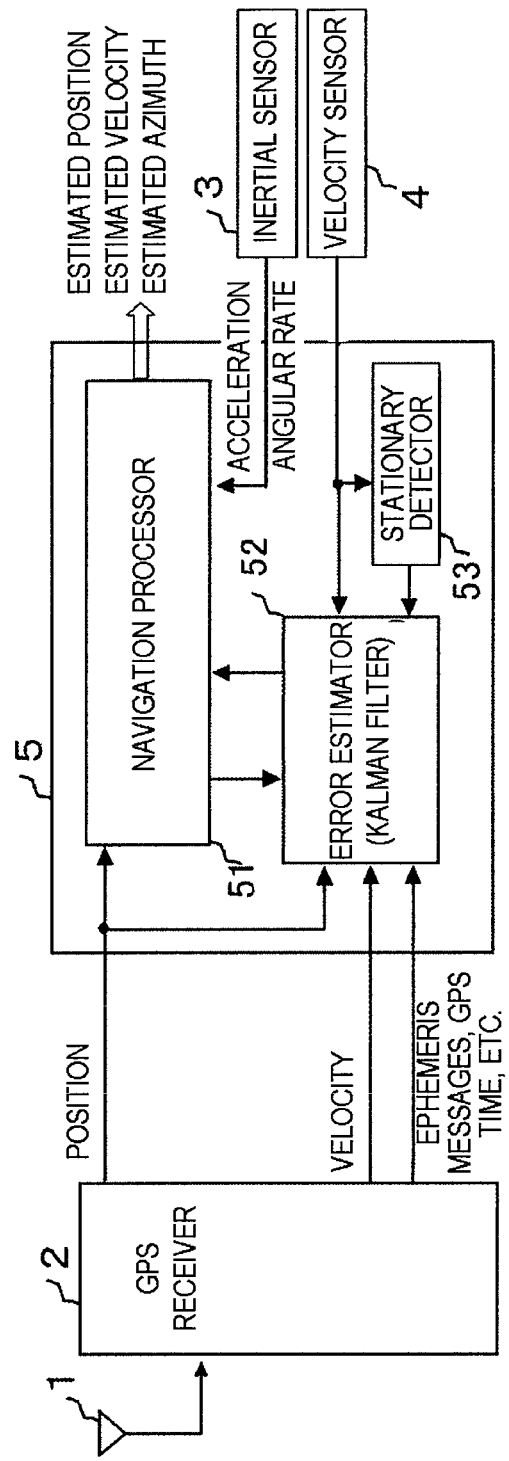
FIG. 1 is a configuration diagram illustrating a GPS integrated navigation system using a single GPS antenna according to an embodiment of the present invention.

1 GPS antenna
2 GPS receiver
3 Inertial sensor
4 Velocity sensor
5 GPS/INS integration processor
10 Attitude computation
51 Navigation processor
52 Error estimator by Kalman filter
53 Stationary detector

DETAILED DESCRIPTION

Embodiment 1

FIG. 1 shows a functional configuration diagram illustrating a GPS composite navigation apparatus constituted with a GPS receiver 2 including a single GPS antenna 1, an inertial sensor 3 including a single-axis accelerometer and a single-axis angular rate sensor, and a velocity sensor 4. In FIG. 1, GPS satellite signals received by the GPS antenna 1 are led to the GPS receiver 2, and in the GPS receiver 2, a GPS position and a GPS velocity are calculated, and then, they are transmitted to a GPS/INS integration processor 5 together with GPS navigation data containing ephemeris messages, GPS time, etc.

Meanwhile, outputs from the inertial sensor 3 constituted with an accelerometer for measuring an acceleration of a moving body in its traveling direction and an angular rate sensor for measuring an angular rate of the vertical movement component of the moving body, and an output from the velocity sensor 4 for measuring a velocity of the moving body in the traveling direction are transmitted to the GPS/INS integration processor 5.

The GPS/INS integration processor 5 includes a navigation processor 51 for calculating an estimated position, an estimated velocity, and an estimated azimuth; an error estimator 52 by Kalman filter for estimating position errors, a velocity error, and an azimuth error, and an accelerometer error and an angular rate sensor errors; and a stationary detector 53.

A navigation processor 51 calculates an estimated position of the moving body in the geodetic frame by carrying out a discrete integration of Equations 1 to 3. Moreover, it calculates an estimated velocity of the moving body in the traveling direction and an estimated azimuth of the moving body with respect to the north direction by carrying out a discrete integration of Equations 5 to 6. Then, it calculates an estimated velocity in the geodetic frame using Equation 4. At this point, for initial values of the estimated position and the estimated velocity, the GPS position and the GPS velocity may be used, and for an initial value of the estimated azimuth, an azimuth calculated from the horizontal component of the GPS velocity may be used, or arbitrary initial values may be used for these. Alternatively, outputs from the navigation processor 51 immediately before a power-off of the system may be stored, and these values may be used as the initial values.

$$\frac{d\phi}{dt} = \frac{v_N}{r_m + h} + w_n \tag{1}$$

$$\frac{d\lambda}{dt} = \frac{v_E}{(r_p + h)\cos\phi} + w_e \tag{2}$$

$$\frac{dh}{dt} = v_D + w_h \tag{3}$$

$$v_N = v_x \cos\psi \quad (4)$$
$$v_E = v_x \sin\psi$$
$$v_D = -v_x \sin\theta$$
$$r_p = \frac{r_e}{\sqrt{1-e^2\sin^2\phi}}$$
$$r_m = \frac{r_p(1-e^2)}{1-e^2\sin^2\phi}$$

Here, $\phi$, $\lambda$, and h are a latitude, a longitude, and an height, respectively. Here, $v_N$, $v_E$, and $v_D$ are an estimated velocity of the north-direction component in the geodetic frame, an estimated velocity of the east-direction component, and an estimated velocity of the vertical component, respectively. Here, $w_n$, $w_e$, and $w_h$ are their model errors, respectively. Here, $\psi$ is an estimated azimuth and $\theta$ is a pitch, and they can be calculated from the GPS velocity, for example; however, they may be approximated by zero when the pitch angle is small. Here, $\omega_e$, $r_e$, and e are the earth rate, the Earth's equatorial radius, and the ellipsoidal eccentricity of the earth, respectively.

Further, an estimated velocity $v_x$ of the moving body in the traveling direction and an estimated azimuth $\psi$ can be calculated based on Equations 5 and 6, respectively.

$$\frac{dv_x}{dt} = a_x + w_a \quad (5)$$

$$\frac{d\Psi}{dt} = \omega_z + w_\omega \quad (6)$$

Here, $a_x$ is the output from the accelerometer and $w_a$ is its error. Here, $\omega_z$ is the output from the angular rate sensor and $w_\omega$ is its error.

The error estimator 52 by Kalman filter in the GPS/INS integration processor 5 estimates states of Equation 7 for every epoch k, using the Kalman filter, based on a dynamic model equation of Equation 8 and a measurement model equation of Equation 10.

$$x = [\delta\phi \; \delta\lambda \; \delta h \; \delta v_x \; \delta\psi \; \delta a_x \; \delta\omega_z]^T \quad (7)$$

Here, $\delta\phi$, $\delta\lambda$, and $\delta h$ are a latitude error, a longitude error, and a height error, respectively. Further, $\delta v_x$ and $\delta\psi$ are errors of $v_x$ and $\psi$, respectively, and $\delta a_x$ and $\delta\omega_z$ are output errors of the accelerometer and the angular rate sensor, respectively.

$$x(k+1) = \Phi(k) \times (k) + Gw \quad (8)$$

Here, $\Phi$ is a transition matrix derived from partial differentiations of Equations 1 to 3, 5 and 6, and G is a driving matrix of errors. Here, k in parentheses is a calculation epoch k. Further, w is an error of the dynamic model and can be expressed by a covariance matrix of Equation 9.

$$Q(k) = \begin{bmatrix} Q_p(k) & O_{3\times1} & O_{3\times1} & O_{3\times1} & O_{3\times1} \\ O_{1\times3} & Q_v(k) & 0 & 0 & 0 \\ O_{1\times3} & 0 & Q_\Psi(k) & Q & 0 \\ O_{1\times3} & 0 & 0 & Q_a & 0 \\ O_{1\times3} & 0 & 0 & 0 & Q_\omega \end{bmatrix} \quad (9)$$

Here; $Q_p$, $Q_v$, $Q_\psi$, $Q_a$, and $Q_\omega$ are variances of model error for Equations 1 to 3, 5, and 6, respectively.

$$Y(k) = H(k) \times (k) + v(k) \quad (10)$$

Here, v is a measurement noise.

For a measurement vector Y(k), Equation 11 is used when the moving body can be deemed to be moving, and it is switched so as to use Equation 13 when the moving body can be deemed to be stopped. In response to this, the measurement noise variance corresponding to Equation 11 is changed to Equation 12, and the measurement noise variance corresponding to Equation 13 is change to Equation 14. Note that, although equations are not shown, a measurement matrix H(k) is switched according to the change of measurement vector Y(k).

The stationary detector 53 for determining the stationary state of the moving body performs the determination using the output from the velocity sensor 4. Note that, although not illustrated, the stationary determination by the stationary detector 53 may be performed using the GPS position, or the estimated position or the estimated velocity obtained from the outputs of the navigation processor 51.

$$Y(k) = \begin{bmatrix} y_p(k) \\ y_v(k) \\ y_{vx}(k) \end{bmatrix} \quad (11)$$

$$R = \begin{bmatrix} R_{p\_gps} & O_{3\times2} & O_{3\times1} \\ O_{2\times3} & R_{v\_gps} & O_{2\times1} \\ O_{1\times3} & O_{1\times2} & \sigma_{vx}^2 \end{bmatrix} \quad (12)$$

Here, $y_p(k)$ is a difference between the estimated position and the GPS position of the current time epoch k, $y_v(k)$ is a difference between the estimated velocity and the GPS velocity of the epoch k, and $y_{vx}(k)$ is a difference between the estimated velocity of the moving body in the traveling direction and the output from the velocity sensor 4 of the epoch k. Here, $R_{p\_GPS}$, and $R_{v\_GPS}$ are variances of the errors of the GPS position and the GPS velocity, and $\sigma_{vx}$ is a standard deviation of the errors of the velocity obtained by the velocity sensor 4. The other matrix elements are zero.

$$Y(k) = \begin{bmatrix} y_p(k) \\ y_{vx}(k) \\ y_\psi(k) \\ y_\omega(k) \end{bmatrix} \quad (13)$$

$$R = \begin{bmatrix} R_{p\_s} & O_{3\times1} & O_{3\times1} & O_{3\times1} \\ O_{1\times3} & \sigma_{vx\_s}^2 & 0 & 0 \\ O_{1\times3} & 0 & \sigma_{\Psi\_s}^2 & 0 \\ O_{1\times3} & 0 & 0 & \sigma_{\omega\_s}^2 \end{bmatrix} \quad (14)$$

Here, $y_p(k)$ is a difference between the estimated positions (latitude, longitude, and height) of the epoch k and the epoch (k−1), $y_{vx}(k)$ is a difference between the estimated velocity of the moving body in the traveling direction of the epoch k and zero, $y_\psi(k)$ is a difference between the estimated azimuths of the epoch k and epoch (k−1), and $y_\omega(k)$ is a difference between the angular rate of the epoch k which is a correction of the output from the angular rate sensor with the angular rate error estimated by the error estimator 52 by Kalman filter and zero.

Note that, when the moving body is stopped from its moving state, $y_p(k)$ and $y_\psi(k)$ may be a difference between the estimated value of the epoch k and the estimated value in the stationary state or immediately before the stop, respectively, instead of the difference between the epoch k and the epoch (k−1). Here, the estimated value immediately before the stop may be a value, for example, when it becomes below a predetermined value. Here, $R_{p\_s}$ is a variance of the errors of the position in the stationary state, $\sigma_{vx\_s}$, and $\sigma_{\psi\_s}$, and $\sigma_{\omega\_s}$ are a standard deviation of the velocity errors of the moving body in the traveling direction in the stationary state, a standard deviation of the estimated azimuths in the stationary state, and a standard deviation of the angular rates in the stationary state, respectively.

A typical algorithm of the Kalman filter calculates, based on Equation 15, a value of the error covariance matrix P(k+1) of the epoch k+1, which is predicted from the measurement-updated error covariance matrix in the epoch k (i.e., a time-updated error covariance matrix P(k+1)).

$$P(k+1)=\Phi(k)P(k)\Phi^T(k)+G(k)Q(k)G^T(k) \qquad (15)$$

The time-updated error covariance matrix calculated by Equation 15 gradually decreases for every measurement-update from a large initial value P(0) toward a value determined by the model errors of Equations 8 and 10.

However, as described above, due to the low-cost system configuration having large dynamic model errors and/or measurement noises of the measurement model and the estimation capability degradation originating from the weak observables in the stationary state of the moving body, the disadvantage in which the estimated position, the estimated velocity, the integrated attitude, and the estimated azimuth change occurs even though the moving body is stopped.

In the known technique in which the velocity measurement is set to zero in the stationary state, the above-described disadvantage cannot be resolved sufficiently. A reason for this is that the measurement noises of the velocity measurements in the stationary state (zero) are to be set to zero, they cannot to be set to zero due to stability of the Kalman filter.

In the present invention, to resolve this condition, the measurement about the position of the measurement model in the stationary state may be set to a difference between the estimated value of the current epoch (epoch k) of the estimated position obtained in the navigation processor 51, and the estimated value at the time of the stationary determination. The velocity measurement of the measurement model in the stationary state may be set to the estimated value of the current epoch of the estimated velocity obtained in the navigation processor 51. Further, the azimuth measurement of the measurement model in the stationary state may be set to a difference between the estimated value of the current epoch of the estimated azimuth obtained in the navigation processor 51 and the estimated value at the time of the stationary determination. Further, the angular rate measurement of the current epoch of the measurement model for the stationary state may be set to the angular rate estimated value which is a correction of the output from the angular rate sensor with the angular rate error estimated by the error estimator 52 by Kalman filter. For the determination of the measurements about the position and the measurements about the azimuth, the estimated value at the time of the stationary determination may be replaced by the estimated value immediately before the stationary determination or the estimated value of the preceding epoch (epoch k−1).

Then, a changed amount ΔP(k) of the measurement-updated error covariance matrix of the Kalman filter is calculated based on Equations 16 to 18.

$$\Delta P(k) = \begin{bmatrix} \Delta Q_p(k) & O_{3\times 1} & O_{3\times 1} & O_{3\times 1} & O_{3\times 1} \\ O_{1\times 3} & 0 & 0 & 0 & 0 \\ O_{1\times 3} & 0 & \Delta Q_\Psi(k) & 0 & 0 \\ O_{1\times 3} & 0 & 0 & 0 & 0 \\ O_{1\times 3} & 0 & 0 & 0 & 0 \end{bmatrix} \qquad (16)$$

Here, $\Delta Q_p$ and $\Delta Q_\psi$ are the correction amounts of variance of the position error and the azimuth error, respectively, and are calculated by Equations 17 and 18.

$$\Delta Q_p(k)=P_p(k_s)-P_p(k) \qquad (17)$$

$$\Delta Q_\psi(k)=P_\psi(k_s)-P_\psi(k) \qquad (18)$$

Here, $P_p$ and $P_\psi$ are variances about the position error and the azimuth error of the measurement-updated error covariance matrix, respectively. Here, ks is any of epochs at the time of the stationary determination, immediately before the stationary determination, and the preceding epoch, and k is the present epoch. Here, for $P_p$ and $P_\psi$, the time-updated error covariance matrix may be used instead of the measurement-updated error covariance matrix.

Then, ΔP(k) is added to or subtracted from any of the measurement-updated value, the predicted value, or the dynamic model error of the current epoch. By this correcting method, the covariance values of the errors about the position and the azimuth in the moving state and the stationary state can be corrected so as to substantially uniform. Thus, it is possible to keep the estimated position and the estimated azimuth unchanged in the stationary state.

Although the calculation of ΔP(k) by Equation 16 is performed by calculating only for the covariance element of the errors about the position and the azimuth, it may be corrected by calculating ΔP(k) about either one of the position and the azimuth depending on the application and the required accuracy. The calculation of ΔP(k) by Equation 16 may also be performed by calculating for all the elements of the error covariance matrix.

Moreover, in Equation 7, the states may be changed suitably for the application and the required accuracy. The calculation of the estimated position, the estimated velocity, and the estimated azimuth in the navigation processor 51 may be performed by calculating only using the velocity of the output from the velocity sensor 4 and the angular rate of the output from the inertial sensor 3. In this case, Equation 5 is not necessary, and it can be directly substituted by the velocity obtained from the velocity sensor 4. In this case, $\delta a_x$ of Equation 7 may be deleted or replaced by the error of the output from the velocity sensor 4.

Embodiment 2

Figure 2:
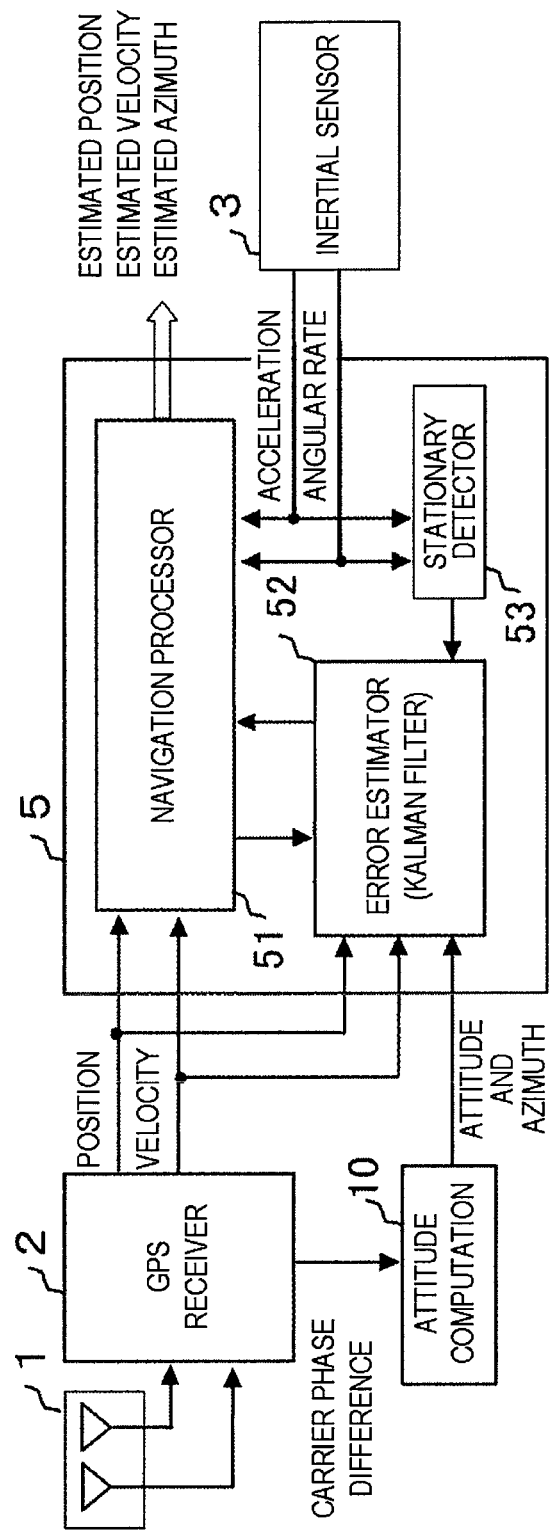
FIG. 2 is a configuration diagram illustrating a GPS composite navigation apparatus using multiple GPS antennas according to an embodiment of the present invention.

FIG. 2 shows a configuration of Embodiment 2. This is a functional block diagram illustrating a GPS composite navigation apparatus using a GPS receiver 2 constituted with multiple GPS antennas 1, an inertial sensor 3 constituted with a three-axis accelerometer and a three-axis accelerometer. In the case of the configuration having the plural GPS antennas, because at least one or more baseline vectors can be generated, the GPS receiver 2 can calculate at least an azimuth, and either a pitch or a roll. Further, if the inertial sensor 3 of the above-described configuration is used, an estimated position, an estimated velocity, an estimated attitude, an azimuth, and the like can be calculated with known navigational equations different from Equations 1 to 6.

In FIG. 2, GPS satellite signals received by the multiple GPS antennas 1 are led to the GPS receiver 2, and carrier phase measurements are generated in the GPS receiver 2. An attitude computation 10 calculates an attitude and an azimuth of a moving body based on the carrier phase measurements. A navigation processor 51 calculates an estimated position, an estimated velocity, an estimated attitude and azimuth by another known calculation technique different from Equations 1 to 6, using the position and the velocity from the GPS receiver 2, the outputs from the inertial sensor 3, and the outputs from the attitude computation 10.

The error estimator 52 by Kalman filter estimates position errors, velocity errors, inertial sensor errors, attitude and an azimuth error, and the like by a known technique based on the outputs from the GPS receiver 2, the outputs from the attitude computation 10, and the output from the navigation processor 51.

The stationary detector 53 detects whether the moving body is moving or not using any of the output from the navigation processor 51, the outputs from the GPS receiver 2, and the output from the inertial sensor 3, or the combination of these.

As described above, the configuration of FIG. 2 is different from that of FIG. 1 in which the attitude and azimuth information can be acquired from the attitude computation 10, and its calculation method of the navigation processor 51. In addition, it differs in only the number of states in Equation 7, the transition matrix of Equation 8, the measurement matrix of Equation 10, etc. When determined to be the stationary state by the stationary detector 53 according to the present invention explained with the configuration of FIG. 1, the method of changing the measurement model used for the measurement-update of the Kalman filter and correcting the changed amount by the update of the error covariance matrix may also be applicable to the configuration of FIG. 2.

What is claimed is:

1. A GPS composite navigation apparatus having at least a GPS receiver and an inertial sensor, comprising:
   a navigation processor for outputting at least any of an estimated position, an estimated velocity, and an estimated azimuth of a moving body;
   an error estimator by Kalman filter for estimating an error of at least any of the estimated position, the estimated velocity, and the estimated azimuth of the outputs from the navigation processor based on an output from the navigation processor and an output from the GPS receiver; and
   a stationary detector for determining a state in which the moving body is in a stationary state,
   wherein, when determined to be in the stationary state by the stationary detector, a measurement model for a moving state used for measurement-update of the Kalman filter is changed to a measurement model for the stationary state, and an error covariance matrix is corrected based on an error amount between error covariance matrices of before and after the moving body is determined to be in the stationary state.

2. The GPS composite navigation apparatus of claim 1, wherein at least one of the measurements about the position and the azimuth in the measurement model for the stationary state is set to a difference between an estimated value of preceding epoch and an estimated value of current epoch of at least one of the estimated position and the estimated azimuth.

3. The GPS composite navigation apparatus of claim 1, wherein, in the correction of the error covariance matrix by the measurement-update, a difference between the measurement-updated value of the current epoch of the error covariance matrices of before and after the moving body is determined to be in the stationary and the measurement-updated value of the preceding epoch of the error covariance matrix is set to a correction amount, and the correction amount is added to or subtracted from any of the measurement-updated value of the current epoch, the time-updated value of the current epoch, and the error variance matrix of a dynamic model.

4. The GPS composite navigation apparatus of claim 1, wherein, in the correction of the error covariance matrix by the measurement-update, a difference between the measurement-updated value of the current epoch of a diagonal element of the error covariance matrices of before and after the moving body is determined to be in the stationary state and the measurement-updated value of the preceding epoch of the diagonal element of the error covariance matrix is set to a correction amount, the correction amount is added to or subtracted from any of a diagonal element of the measurement-update value of the current epoch, the time-updated value of the current epoch, and the error variance matrix of a dynamic model.

5. The GPS composite navigation apparatus of claim 2, wherein at least one of the estimated position and the estimated azimuth of the preceding epoch, or the measurement-updated value of the error covariance matrix of the preceding epoch is set to the estimated value or measurement-updated value of the error covariance matrix, which is either for the stationary state or immediately before the stop.

6. The GPS composite navigation apparatus of claim 1, wherein the navigation processor outputs the position, the velocity, and the azimuth of the moving body based on at least the position of the output from the GPS receiver, and outputs of an accelerometer for measuring an acceleration of a moving body in its traveling direction and an angular rate sensor for measuring a rotation rate of the moving body about an azimuth axis.

7. The GPS composite navigation apparatus of claim 6, wherein a velocity sensor for measuring a velocity of the moving body in its traveling direction is additionally provided, and the output from the accelerometer is substituted by the output of the velocity sensor.

8. The GPS composite navigation apparatus of claim 2, wherein, for the measurement of the measurement model for the stationary state, the measurement of at least one of the velocity and a rotation component of the angular rate about an azimuth axis of the moving body is added, and the measurement of at least one of the velocity and the angular rate is set to an estimated value of the current epoch.

9. The GPS composite navigation apparatus of claim 3, wherein at least one of the estimated position and the estimated azimuth of the preceding epoch, or the measurement-updated value of the error covariance matrix of the preceding epoch is set to the estimated value or measurement-updated value of the error covariance matrix, which is either for the stationary state or immediately before the stop.

10. The GPS composite navigation apparatus of claim 4, wherein at least one of the estimated position and the estimated azimuth of the preceding epoch, or the measurement-updated value of the error covariance matrix of the preceding epoch is set to the estimated value or measurement-updated value of the error covariance matrix, which is either for the stationary state or immediately before the stop.

11. The GPS composite navigation apparatus of claim 1, wherein:
   the navigation processor outputs at least one of the estimated position and the estimated azimuth; and
   correcting the changed amount of the error covariance matrix is unchanged in the stationary state.

12. The GPS composite navigation apparatus of claim 1, wherein:
the navigation processor outputs at least one of the estimated position and the estimated azimuth; and
correcting the changed amount of the error covariance matrix corrects covariance values of the errors for the at least one of the estimated position and the estimated azimuth in the moving state and the stationary state to substantially uniform.

* * * * *